United States Patent [19]

Delprato et al.

[11] Patent Number: 5,098,686

[45] Date of Patent: Mar. 24, 1992

[54] SYNTHESIS OF ZEOLITES OF FAUJASITE STRUCTURE

[75] Inventors: Francois Delprato, Riedisheim; Jean-Louis Guth, Brunstatt; Didier Anglerot, Pau; Catherine Zivkov, Narosse, all of France

[73] Assignee: Societe Nationale Elf Aquitaine, Paris, France

[21] Appl. No.: 499,272

[22] PCT Filed: Oct. 10, 1989

[86] PCT No.: PCT/FR89/00522

§ 371 Date: Jun. 8, 1990

§ 102(e) Date: Jun. 8, 1990

[87] PCT Pub. No.: WO90/03944

PCT Pub. Date: Apr. 19, 1990

[30] Foreign Application Priority Data

Oct. 10, 1988 [FR] France ............... 88 13269

[51] Int. Cl.$^5$ ............... C01B 33/34
[52] U.S. Cl. ............... 423/308; 423/329; 502/79
[58] Field of Search ............... 423/328, 329, 330; 502/64–79

[56] References Cited

U.S. PATENT DOCUMENTS

| 2,882,244 | 4/1959 | Milton ............... 423/328 |
| 3,130,007 | 4/1964 | Breck ............... 423/329 |
| 3,306,922 | 2/1967 | Barrer et al. ............... 423/328 |
| 4,377,502 | 3/1983 | Klotz ............... 423/329 |
| 4,714,601 | 12/1987 | Vaughan ............... 423/328 |

FOREIGN PATENT DOCUMENTS

| 57-106518 | 7/1982 | Japan ............... 423/329 |
| 1314117 | 4/1973 | United Kingdom ............... 423/329 |

*Primary Examiner*—R. Bruce Breneman
*Attorney, Agent, or Firm*—Burgess, Ryan and Wayne

[57] ABSTRACT

A process is provided for the preparation of zeolites belonging to the faujasite structural class and exhibiting a Si:Al ratio higher than 1 in which a reaction mixture is first produced which has a pH higher than 10 and contains water, a source of tetravalent silicon, a source of trivalent aluminum, a source of hydroxide ions in the form of a strong inorganic or orgnaic base and a structuring agent ST so as to produce an aluminosilicate gel having the desired composition to permit its crystallization into a compound of the faujasite structural class. The gel obtained is kept at a temperature, pressure and for a sufficient period to effect the crystallization of the gel into a precursor of the zeolite consisting of the zeolite trapping the structuring agent ST in its cavities and the precursor is then subjected to a calcination to destroy the structuring agent and to produce the zeolite. The structuring agent ST consists of at least one compound belonging to the group formed by the carbon-containing macrorings and macropolyrings which contain in the rings, heteroatoms chosen from oxygen, nitrogen, silicon and sulphur, and which contain 10 to 24 atoms per ring. Precursors of the zeolites are also provided.

47 Claims, No Drawings

SYNTHESIS OF ZEOLITES OF FAUJASITE STRUCTURE

BACKGROUND OF THE INVENTION

The invention relates to a process for the synthesis of zeolites belonging to the faujasite structural group. It further relates to the products obtained and to their application in adsorption and catalysis.

DESCRIPTION OF THE RELATED ART

Zeolites are crystalline tectosilicates. The structures consist of assemblies of $TO_4$ tetrahedra forming a three-dimensional skeleton by sharing oxygen atoms. In zeolites of the aluminosilicate type which are the most common ones, T denotes tetravalent silicon and trivalent aluminium. The abovementioned three-dimensional skeleton exhibits cavities and channels which have molecular dimensions and accommodate cations compensating the charge deficiency linked with the presence of trivalent aluminium in the $TO_4$ tetrahedra, the said cations being generally exchangeable.

As a general rule, the composition of zeolites may be denoted by the empirical formula ($M_{2/n}O$; $Y_2O_3$; x $ZO_2$) in the dehydrated and calcined state. In this formula Z and Y denote the tetravalent and trivalent elements of the $TO_4$ tetrahedra respectively, M denotes an electropositive element of valency n, such as an alkali or alkaline-earth metal and constitutes the compensating cation, and x is a number which can vary from 2 to theoretically infinity, in which case the zeolite is a silica.

Each type of zeolite has a distinct microporous structure. The variation in the dimensions and shapes of the micropores from one type to another results in changes in the adsorbent properties. Only molecules which have certain dimensions and shapes are capable of entering the pores of a particular zeolite.

Because of these remarkable characteristics, zeolites are very particularly suitable for the purification or separation of gaseous or liquid mixtures, such as, for example, the separation of hydrocarbons by selective adsorption.

The chemical composition, including in particular the nature of the elements present in the $TO_4$ tetrahedra and the nature of the exchangeable compensating cations, is also an important factor involved in the selectivity of the adsorption, and above all in the catalytic properties of these products. They are employed as catalysts or catalyst supports in the cracking, reforming and modification of hydrocarbons, and in the conversion of many molecules.

Many zeolites exist in nature; they are aluminosilicates whose availabilities and properties do not always correspond to the requirements of industrial applications. Consequently, the search for products which have new properties has led to the synthesis of a large variety of zeolites, essentially of the aluminosilicate type. Among the many examples of this type there may be mentioned zeolite A (U.S. Pat. No. 2,882,243), zeolite X (U.S. Pat. No. 2,882,244), zeolite Y (U.S. Pat. No. 3,130,007), zeolite L (FR-A-1,224,154), zeolite T (FR-A-1,223,775), zeolite ZSM5 (U.S. Pat. No. 3,702,886), zeolite ZSM 12 (U.S. Pat. No. 3,832,449) and zeolite ZSM 48 (EP-A-0,015,132).

Zeolites of the faujasite structural group are characterized by a three-dimensional framework structure which can be described by means of the assembly of modules called cube-octahedra. Each of these modules consist of 24 tetrahedra containing the elements Si and Al and bridged by oxygen according to the principle described above. In the cube-octahedron the tetrahedra are linked so as to form eight rings containing six tetrahedra and six rings containing four tetrahedra. Each cube-octahedron is joined with tetrahedral coordination, via four rings containing six tetrahedra, to four neighbouring cube-octahedra.

To show the relationships which unite the various members of the structural group it is convenient to consider the structural planes in which the cube-octahedra are arranged at the vertices of a plane network of hexagons. Each cube-octahedron is thus connected to three neighbours in the structural plane.

The fourth connecting direction is directed alternately on each side of the structural plane and enables the cube-octahedra to be connected between neighbouring and parallel structural planes.

According to the mutual relative arrangement of these structural planes, it is possible to obtain sequences of three distinct structural planes ABCABC . . . corresponding to a structure of cubic symmetry, sequences of two distinct structural planes ABAB . . . corresponding to a structure of hexagonal symmetry, more complex sequences, which may be regular or irregular.

All the solids belonging to the faujasite structural group are polytypes and have interconnected channels approximately 0.8 nm is diameter. Thus, faujasite is a natural zeolite whose structure corresponds to the stacking of three distinct structural planes ABC corresponding to a structure of cubic symmetry. Compounds with the same structure as faujasite can be obtained by synthesis from a sodium aluminosilicate gel, the said compounds being called zeolites X when the Si:Al ratio of the number of atoms of silicon to the number of atoms of aluminium is between 1 and 1.5, and zeolites Y when the said Si:Al ratio is between 1.5 and 3. Si:Al ratios higher than 3 cannot be obtained by synthesis.

Nevertheless, there exist postsynthesis treatments which make it possible to raise the value of the Si:Al ratio above 3, for example a high-temperature steam treatment after the Na+ cations have been exchanged for protons or lanthanum cations. Certain properties can thus be improved, such as the hydrothermal stability needed in certain applications like, for example, the cracking of hydrocarbon molecules in petroleum refining.

Compounds whose structure approaches the hexagonal structure ABABAB . . . can also be obtained by synthesis, but with stacking defects, which are seen as the broadening of some lines in the x-ray diffraction patterns employed to identify these compounds. Thus, zeolite ZSM-3 (U.S. Pat. No. 3,415,736) is prepared in a medium containing Na+ and Li+ cations; its Si:Al ratio is close to 1.5. By employing the Cs+ and Na+ cation pair, zeolite CSZ-3 (U.S. Pat. No. 4,333,859) is obtained, whose Si:Al ratio is close to 3. Zeolites of the type ZSM 20 (U.S. Pat. No. 3,972,983) crystallize in the presence of tetraethylammonium cations (TEA+) associated with Na+ cations; however, to obtain the maximum Si:Al ratio of 4.4, an aluminosilicate gel which has a Si:Al ratio close to 15 and a TEA+:Si molar ratio close to 1 must be employed.

The general process of synthesis of zeolites of the faujasite structural group consists of a hydrothermal crystallization of aluminosilicate gels of particular compositions containing a structuring agent, which may be a metal cation and optionally an organic cation or compound such as TEA+.

More precisely, a process of this kind consists in producing first of all a reaction mixture which has a pH higher than 10 and contains water, a source of tetravalent silicon, a source of trivalent aluminium, a source of hydroxide ions in the form of a strong inorganic or organic base, optionally a source of $M^{n+}$ metal cations, n being the valency of M, and optionally a structuring agent ST so as to obtain an aluminosilicate gel which has the desired composition to permit its crystallization into a compound of the faujasite structural group, and in then maintaining the gel obtained, directly or after prior maturing, at a temperature not exceeding 150° C. and under a pressure which is at least equal to the autogenous pressure of the mixture consisting of the said gel for a sufficient period to effect the crystallization of this gel.

When the structuring agent is an organic compound such as TEA+, the product resulting from the crystallization, after washing with distilled or deionized water and drying below 100° C., is a precursor of the required zeolite, which consists of the said zeolite trapping the structuring agent in its cavities. The change from the precursor to the corresponding zeolite is made by subjecting the said precursor to a calcination at a temperature which is suitable for destroying the organic structuring agent.

As indicated earlier, a process of this kind does not make it possible to synthesize zeolites which have the faujasite structure of cubic symmetry and a Si:Al ratio higher than 3. Moreover, in the case of the synthesis of hexagonal polytype zeolites of faujasite, obtaining a Si:Al ratio higher than 3 requires the use of an aluminosilicate gel exhibiting a high Si:Al ratio and simultaneously containing a molar quantity of structuring agent, for example TEA+ cations, which is close to the molar quantity of silica employed to form the initial reaction mixture, that is to say substantially higher than the molar quantity of the aluminium element.

SUMMARY OF THE INVENTION

It has now been found that certain organic molecules belonging to the class of carbon-containing macrorings and macropolyrings containing heteroatoms chosen from oxygen, nitrogen, silicon and sulphur, have the property of directing the crystallization of aluminosilicate gels towards zeolites of the faujasite structural group, which are characterized by a high Si:Al ratio, generally higher than 3. Depending on the size and the symmetry of the macroring or macropolyring, it is possible to obtain either a zeolite exhibiting a cubic structure or a zeolite exhibiting a hexagonal structure. It is also possible to obtain a zeolite of faujasite type, made up of variable proportions of these two types of structure by employing mixtures of the said molecules of the abovementioned type with each other or with oxygen-containing acyclic costructurants. The use of the said costructurants mixed with some of the molecules of the abovementioned type also makes it possible to form zeolites of the faujasite type with cubic structure. Furthermore, the macroring or macropolyring introduces a pronounced stabilizing effect, which makes it possible to decrease the concentration of the hydroxide ions in the synthesis medium, which results in obtaining a high Si:Al ratio and a substantial improvement in the yield, the said stabilizing effect still being maintained in the presence of the oxygen-containing acyclic costructurant. Thus, the Si:Al ratio of the initial gel may be very close to the final Si:Al ratio in the zeolite crystals.

DESCRIPTION OF THE PREFERRED EMBODIMENTS

The subject of the invention is therefore a process for the preparation of zeolites belonging to the faujasite structural class and exhibiting a Si:Al ratio higher than 1 and capable of exceeding 3, the said process being of the type in which a reaction mixture is produced first of all, which has a pH higher than 10 and contains water, a source of tetravalent silicon, a source of trivalent aluminium, a source of hydroxide ions in the form of a strong inorganic or organic base and a structuring agent ST so as to obtain an aluminosilicate gel having the desired composition to permit its crystallization into a compound of the faujasite structural class. The gel obtained is then maintained, optionally after prior maturing, at a temperature not exceeding 150° C. and at a pressure at least equal to the autogenous pressure of the mixture consisting of the said gel for a sufficient period to effect the crystallization of this gel into a precursor of the zeolite consisting of the zeolite trapping the structuring agent ST in its cavities. The said precursor is subjected to a calcination to destroy the structuring agent and to produce the zeolite, and it is characterized in that the structuring agent ST consists of at least one compound MC belonging to the group formed by the carbon-containing macrorings and macropolyrings which contain in the ring(s) heteroatoms chosen from oxygen, nitrogen, silicon and sulphur and which contain 10 to 24 atoms per ring.

The quantity of structuring agent ST present in the reaction mixture intended to form the gel is advantageously such as to make the molar ratio ST:Al$^{III}$ range from 0.1 to 4, the said ratio preferably ranging from 0.1 to 1 and very particularly from 0.2 to 0.5.

In particular, the ingredients making up the reaction mixture giving rise to the aluminosilicate gel are employed so that the said gel may have, in terms of molar ratios, the following composition,

| | Advantageous ranges | Preferred ranges |
|---|---|---|
| Si$^{IV}$:Al$^{III}$ | 2 to 20 | 4 to 10 |
| OH$^-$: Al$^{III}$ | 0.5 to 8 | 1 to 6 |
| ST:Al$^{III}$ | 0.1 to 4 | 0.1 to 1 |
| H$_2$O:Al$^{III}$ | 40 to 200 | 50 to 150 |

The MC compounds which can be employed to form the structuring agent ST in the process according to the invention may be especially:
crown ethers whose ring contains 10 to 24 atoms and comprises solely oxygen atoms as heteroatoms, at least 4 in number, among which the following compounds may be mentioned:
1,4,7,10-tetraoxacyclododecane(12-crown-4 ether),
1,4,7,10,13-pentaoxacyclopentadecane(15-crown-5 ether),
1,4,7,10,13,16-hexaoxacyclooctadecane(18-crown-6-ether),
2,3,11,12-dibenzo-1,4,7,10,13,16-hexaoxacyclooctadecane (dibenzo-18-crown-6 ether), 2,3,11,12-dicyclohexano-1,4,7,10,13,16-hexaoxacyclooctadecane (dicyclohexano-18-crown-6 ether),
2,3,14,15-dibenzo-1,4,7,10,13,16,19,22-octaoxacyclotetracosane(dibenzo-24-crown-8 ether),
2,3,14,15-dicyclohexano-1,4,7,10,13,16,19,22-octaoxacyclotetracosane(dicyclohexano-24-crown-8 ether),
2,3-benzo-1,4,7,10,13-pentaoxacyclopentadecane(benzo-15-crown-5 ether);

compounds which have a structure comparable to that of the above crown ethers but in which the oxygen atoms in the ring are partially or completely replaced by substituents chosen from sulphur atoms and the groups >NH, >NR and >SI<$_R^R$ in which R is a $C_1$-$C_4$ hydrocarbyl, among which there may be mentioned the following compounds:

1,4,8,11-tetraazacyclotetradecane,
1,4,8,12-tetraazacyclopentadecane,
1,4,8,11-tetraazacyclotridecane,
1,4,7,10,13,16-hexaazacyclooctadecane trisulphate (hexacyclene trisulphate),
14-(1,1-dimethylsila)-1,4,7,10,13-pentaoxacyclotetradecane (dimethylsila-14-crown-5 ether),
11-(1,1-dimethylsila)-1,4,7,10-tetraoxacycloundecane (dimethylsila-11-crown-4 ether) and its 3,6,9-methyl derivative,
17-(1,1-dimethylsila)-1,4,7,10,13,16-hexaoxacycloheptadecane (dimethylsila-17-crown-6 ether),
20-(1,1-dimethylsila)-1,4,7,10,13,16,19-heptaoxacycloeicosane (dimethylsila-20-crown-7 ether),
1,4,7,10,13,16-hexathiacyclooctadecane,
17-(1-methyl-1-vinylsila)-1,4,7,10,13,16-hexaoxacycloheptadecane (methylvinylsila-17-crown-6 ether),
14-(1-methyl-1-vinylsila)-1,4,7,10,13-pentaoxacyclotetradecane (methylvinylsila-14-crown-5 ether),
1,7,10,16-tetraoxa-4,13-diazacyclooctadecane (Kryptofix 22),
1,7,10-trioxa-4,13-diazacyclopentadecane (Kryptofix 2.1);

carbon-containing macropolyrings of the type of polyoxadiazabicycloalkanes in which each ring contains 10 to 18 atoms and has at least two oxygen atoms in addition to the two nitrogen atoms, among which there may be mentioned the following compounds:

4,7,13,16,21-pentaoxa-1,10-diazabicyclo[8.8.5]tricosane (Kryptofix 2.2.1),
4,7,13,16,21,24-hexaoxa-1,10-diazabicyclo[8.8.8]hexacosane (Kryptofix 2.2.2).

The use of a structuring agent $ST_2$ consisting of at least one compound $MC_2$ chosen from the macrorings according to the invention whose ring contains at least 18 atoms, for example 1,4,7,10,13,16-hexaoxacyclooctadecane, 1,7,10,16-tetraoxa-4,13-diazacyclooctadecane, hexacyclene trisulphate or 1,4,7,10,13,16-hexathiacyclooctadecane, results in the formation of zeolites which have the hexagonal symmetry structure of the hexagonal polytypes of faujasite.

The use of a structuring agent $ST_1$ consisting of at least one compound $MC_1$ chosen from the macrorings according to the invention which have from 10 to 17 atoms in the ring and the macropolyrings according to the invention which have a number of atoms ranging from 10 to 18 in each ring, for example 1,4,7,10,13-pentaoxacyclopentadecane, 4,7,13,16,21,24-hexaoxa-1,10-diazabicyclo[8.8.8]hexacosane or 17-(1,1-dimethylsila)-1,4,7,10,13,16-hexaoxacycloheptadecane, produces zeolites which have the faujasite structure of cubic symmetry.

When employing a structuring agent ST consisting of a mixture of at least one compound $MC_1$ with at least one compound $MC_2$, zeolites of the faujasite type are obtained, which are products made up of domains which have the structure of a cubic faujasite and of domains which have the structure of a hexagonal faujasite.

To characterize these products, a coefficient $\alpha$ may be defined, denoting the fraction of phase of the faujasite type with a structure of hexagonal symmetry in the product, the said coefficient $\alpha$ being such that $\alpha=1$ for a product consisting solely of a faujasite with a structure of hexagonal symmetry and that $\alpha=0$ for a product consisting solely of a faujasite with a structure of cubic symmetry.

In an alternative form of the process according to the invention, the structuring agent ST results from the association of at least one compound MC defined earlier and therefore including the compounds $MC_1$ and $MC_2$ with a costructurant CS consisting of at least one oxygen-containing acyclic compound chosen from the compounds of formula

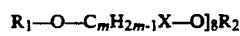
$$R_1\text{—}O\text{—}C_mH_{2m-1}X\text{—}O]_gR_2$$

in which each of $R_1$ and $R_2$, which are identical or different, denotes a hydrogen atom or a $C_1$-$C_4$ alkyl radical, X denotes a hydrogen atom or an —OH radical, m is equal to 2 or 3 and may be different from one repeat unit to another and g is a number ranging from 1 to 12.

Examples of compounds of abovementioned formula which may be employed to form the costructurant are such as ethylene glycol methyl ether of formula $CH_3OCH_2CH_2OH$, ethylene glycol dimethyl ether of formula $CH_3OCH_2CH_2OCH_3$, ethylene glycol of formula $HOCH_2CH_2OH$, propylene glycol of formula $HOCH_2CH_2CH_2OH$, methyl ethers of polyethylene glycols of formula $CH_3\text{—}O\text{—}CH_2CH_2O]_{g1}H$ and polyethylene glycols of formula $OH\text{—}CH_2CH_2O]_{g1}H$ with $g_1$ ranging from 2 to 9, and especially tetraethylene glycol, pentaethylene glycol, hexaethylene glycol, heptaethylene glycol, octaethylene glycol and mixtures of such glycols, polypropylene glycols of formula $HO\text{—}CH_2CH_2CH_2O]_{g1}H$ with $g_1$ ranging from 2 to 9, and especially tripropylene glycol and tetrapropylene glycol.

The quantity of structuring agent resulting from the association of at least one compound MC with the costructurant CS, which is present in the reaction mixture intended to form the gel and the composition of the said structuring agent are such as to make the molar ratio structuring agent:$Al^{III}$ range from 0.1 to 4 and so as to make the molar ratio MC:$Al^{III}$ equal to or higher than 0.05. The said quantity and composition are preferably such as to make the molar ratio structuring agent: $Al^{III}$ range from 0.2 to 2 and to make the molar ratio MC:$Al^{III}$ equal to or higher than 0.1.

The costructurant CS defined above directs the crystallization of the aluminosilicate gels towards zeolites of the faujasite type with a structure of cubic symmetry. A structuring agent $ST_3$ associating the costructurant CS and at least one compound $MC_1$ results in the formation of zeolites of faujasite type with a structure of cubic symmetry. A structuring agent associating the costructurant CS and at least one compound $MC_2$ results in the formation of products made up of domains which have the structure of a cubic faujasite and of domains which have the structure of a hexagonal faujasite. Similarly, by associating a structuring agent $ST_3$ with at least one compound $MC_2$, products made up of domains of the above-mentioned two types are also obtained.

Among the sources of tetravalent silicon $Si^{IV}$ which can be employed in the preparation of the reaction mixture intended to form the aluminosilicate gel there may be mentioned finely divided solid silicas in the form of hydrogels, aerogels or colloidal suspensions, water-soluble silicates such as alkali metal silicates like sodium silicate, and hydrolysable silicic esters such as tetraalkyl orthosilicates of formula $Si(OR)_4$ in which R denotes a $C_1$–$C_4$ alkyl such as methyl and ethyl. The source of silicon is used in the form of a true aqueous solution, in the case of water-soluble silicates, or else of an aqueous suspension which may be colloidal, in the case of finely divided silicas.

Suitable sources of trivalent aluminium $Al^{III}$ are aluminium salts such as aluminium sulphate, nitrate, chloride, fluoride, acetate, aluminium oxides and hydroxyoxides, aluminates and especially alkali metal aluminates such as sodium aluminate, and aluminium esters such as aluminium trialkoxides of formula $Al(OR)_3$ in which R denotes a $C_1$–$C_4$ alkyl radical such as methyl, ethyl or propyl.

The source of hydroxide ions is chosen from strong inorganic bases, especially hydroxides of the alkali metals of group IA of the Periodic Classification of the Elements and hydroxides of the alkaline-earth metals Ca, Sr and Ba, and strong organic bases, especially quaternary ammonium hydroxides, preference being given to inorganic bases and especially to sodium hydroxide NaOH.

The reaction mixture intended to form the alumonisilicate gel may also contain $M^{n+}$ cations of at least one metal M, of valency n, other than the metals whose hydroxides are strong bases, in an overall quantity such as to make the molar ratio $M^{n+}:Al^{III}$ not exceed 0.4 and preferably not exceed 0.3. The said $M^{n+}$ cations are introduced into the said reaction mixture in the form of salts such as sulphates, nitrates, chlorides or acetates or else in the form of oxides.

Examples of such cations which may be mentioned are especially $Co^{++}$, $Cd^{++}$, $Mg^{++}$ and $Ag^+$.

Mixing of the ingredients constituting the reaction mixture intended to form the aluminosilicate gel may be performed in any order. The said mixing is advantageously carried out by preparing first of all, at room temperature, a basic aqueous solution containing a strong base, the structuring agent ST and the cations $M^{n+}$ if they are employed, and in then incorporating into this solution an aqueous solution of the source of trivalent aluminium and an aqueous solution or a suspension, colloidal or otherwise, of the source of tetravalent silicon.

The pH of the reaction mixture, whose value is higher than 10, is preferably close to 13.

Before proceeding to crystallize the gel, crystallization seeds may be added to the reaction mixture intended to form the said gel, in a quantity advantageously ranging from 0.1% to 10% by weight of the reaction mixture. These seeds may be produced either by grinding a zeolite of the same kind as the crystalline phase to be produced or else by synthesis from a suitable nucleating solution. For example, an appropriate nucleating solution has the following composition, expressed as oxides:

15 $Na_2O$; 1 $Al_2O_3$; 10 $SiO_2$; 180 $H_2O$

In the absence of addition of seeds, it is advantageous to subject the aluminosilicate gel formed from the reaction mixture to a maturing operation in a closed vessel, at a temperature below the crystallization temperature for a period which may range from approximately 6 hours to approximately 6 days. The said maturing may be carried out in a static regime or with stirring.

The crystallization of the aluminosilicate gel, with or without seed, is carried out by heating the reaction mixture to a temperature not exceeding 150° C. and preferably ranging from 90° C. to 120° C. and at a pressure corresponding at least to the autogenous pressure of the reaction mixture forming the gel. The heating period needed for the crystallization depends on the composition of the gel and on the crystallization temperature. It is generally between 2 hours and a fortnight.

The crystals obtained, referred to as zeolite precursors and consisting of the zeolite trapping the structuring agent in its pores and cavities, are separated from the crystallization medium by filtration and are then washed with distilled or deionized water until weakly basic wash liquors are obtained, that is to say whose pH is lower than 9. The washed crystals are then dried in an oven at a temperature of between 50° C. and 100° C. and preferably in the region of 70° C.

The zeolite is obtained from the crystals of the precursor by subjecting the said crystals to a calcination at a temperature above 300° C. and preferably between 400° C. and 700° C. for a sufficient period of time to remove the structuring agent present in the precursor.

As indicated earlier, the zeolites prepared by the process according to the invention have Si:Al ratios higher than 1 and capable of exceeding 3 and, depending on the nature of the structuring agent, may be either zeolites of the faujasite type exhibiting a structure of cubic symmetry or else hexagonal polytype zeolites of faujasite exhibiting a structure of hexagonal symmetry or else products made up of domains corresponding to a cubic faujasite and of domains corresponding to a hexagonal faujasite.

The characterization of the products according to the invention, namely the precursors resulting from the crystallization and the zeolites proper resulting from the calcination of the precursors, can be performed by employing the following techniques:

Electron microscopy

In the electron microscope, the products of cubic structure are seen in forms which are compatible with cubic symmetry (for example regular octahedra), whereas products of hexagonal structure are seen in forms which are compatible with hexagonal structure (for example hexagonal platelets).

X-ray diffraction pattern

This diffraction pattern is obtained by means of a diffractometer using the traditional powder method with copper K$\alpha$ radiation. An internal standard enables the values of the angles $2\theta$ associated with the diffraction peaks to be determined accurately. The various lattice spacing distances $d_{hkl}$, characteristic of the sample, are calculated from the Bragg relationship. The estimate of the error of measurement $\Delta(D_{hkl})$ over $d_{hkl}$ is calculated, as a function of the absolute error $\Delta(2\theta)$ associated with the measurement of $2\theta$, using the Bragg relationship. In the presence of an internal standard, this error is reduced to a minimum and commonly taken as equal to $\pm 0.05°$. The relative intensity $I/Io$ associated with each $d_{hkl}$ value is estimated from the height of the corresponding diffraction peak. A scale of notations is employed to characterize this relative intensity as follows: VS=very strong, S=strong, mS=medium strong, m=medium, mw=medium weak, w=weak, vw=very weak.

Thermogravimetry

The thermograms obtained with the product samples make it possible to quantify the number of molecules of structuring agent and the number of molecules of water present in a unit cell of the structure.

Carbon 13 NMR

Carbon 13 NMR in crossed polarization with rotation at the magic angle performed on the samples of the precursor enables the presence of the structuring agent in the cavities of the product to be confirmed.

Determination of the Si:Al ratio

This can be carried out by resorting to any one of the following techniques:
  chemical analysis
  radiocrystallography (cf. D. W. Breck: "Zeolite Molecular Sieves", publ. John Wiley and Sons, New York, 1974, page 94)
  silicon 29 NMR (cf. J. Klinowski: "Progress in NMR Spectroscopy", 1984, Vol. 16, pages 237 to 309).

The zeolites according to the invention of the faujasite type with structure of cubic symmetry exhibit a cubic unit cell parameter a value of between 2.4 and 2.5 nm.

These cubic zeolites can be given the following formula (I), reduced to a unit cell (assembly of 192 tetrahedra):

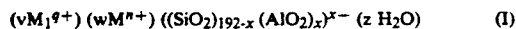

$$(vM_1^{q+})(wM^{n+})((SiO_2)_{192-x}(AlO_2)_x)^{x-} (z\ H_2O) \quad (I)$$

with, in this formula, $M_1^{q+}$ denoting a q-valent cation of a metal of group IA of the Periodic Classification of the Elements (q=1) or of an alkaline-earth metal chosen from Ca, Sr and Ba (q=2) or a monovalent cation containing nitrogen (q=1), especially ammonium or quaternary ammonium, $M^{n+}$ denoting a metal cation of valency n other than a cation $M_1^{q+}$, x, z, w and v being numbers such that $30 < x \leq 96$, $Z \geq 0$ according to the hydration state of the zeolite (z=0 for a completely anhydrous zeolite), $0 < v \leq x/q$ and $0 \leq w \leq x/n$ with $qv+wn \geq x$.

The zeolites according to the invention of the faujasite hexagonal polytype type have a structure of hexagonal symmetry which has hexagonal unit cell parameters a, b and c such that $1.72 < a = b < 1.77$ nm and $2.80 < c < 2.89$ nm.

These hexagonal polytypes can be given the following formula (II) reduced to a unit cell (assembly of 96 tetrahedra):

$$(u\ M_1^{q+})(r\ M^{n+})((SiO_2)_{96-y}(AlO_2)_y)^{y-} (t\ H_2O) \quad (II)$$

with, in this formula, $M_1^{q+}$ denoting a q-valent cation of a metal of group IA of the Periodic Classification of the Elements (q=1) or of an alkaline-earth metal chosen from Ca, Sr and Ba (q=2) or a monovalent cation containing nitrogen (q=1), especially ammonium or quaternary ammonium, $M^{n+}$ denoting a metal cation of valency n other than a cation, $M_1^{q+}$, y, t, u and r being numbers such that $15 \leq y \leq 48$, $t \geq 0$ according to the hydration state of the zeolite (t=0 for a completely anhydrous zeolite), $0 < u \leq y/q$ and $0 \leq r \leq y/n$ with $qu+rn \geq y$.

In the interlayered products, the phases or domains exhibiting a structure corresponding to that of a faujasite with structure of cubic symmetry can also be denoted by the formula (I), while the phases or domains exhibiting a structure corresponding to that of a faujasite hexagonal polytype can also be denoted by the formula (II).

Tables I and II below show the characteristic x-ray diffraction pattern of the cubic zeolites of the faujasite type (Table I) or of the faujasite hexagonal polytypes (Table II), after the products have been calcined for 4 hours at 600° C.

In the $d_{hkl}$ column average values of the lattice spacing distances have been given. Each of these values must be associated with the measurement error $\Delta(d_{hkl})$ of between $\pm 0.2$ and $\pm 0.008$.

The variations which can be observed in relation to these average values are essentially linked with the nature of the compensating cations and with the Si:Al ratio of the zeolite. The same remarks apply to the relative intensities $I/Io$.

TABLE I

| $2\theta$ (degrees) | $d_{hkl}(10^{-1}$ nM) | (hkl) | $I/Io$ |
|---|---|---|---|
| 6.245 | 14.14 ± 0.2 | (1 1 1) | VS |
| 10.205 | 8.66 | (2 2 0) | S |
| 11.965 | 7.39 | (3 1 1) | mS |
| 15.735 | 5.627 ± 0.05 | (3 3 1) | S |
| 18.775 | 4.721 | (5 1 1) | w |
| 20.465 | 4.335 | (4 4 0) | mw |
| 22.895 | 3.881 | (6 2 0) | w |
| 23.755 | 3.727 | (5 3 3) | mS |
| 25.105 | 3.544 | (4 4 4) | vw |
| 25.965 | 3.428 | (5 5 1) | vw |
| 27.175 | 3.279 | (6 4 2) | mS |
| 27.885 | 3.196 ± 0.008 | (7 3 1) | vw |
| 29.765 | 2.999 | (7 3 3) | w |

TABLE II

| $2\theta$ (°) | $d_{hkl}(10^{-1}$ nM) | (h k l) | $I/Io$ |
|---|---|---|---|
| 5.88 | 15.03 ± 0.2 | (1 0 0) | VS |
| 6.23 | 14.2 | (0 0 2) | VS |
| 6.66 | 13.3 | (1 0 1) | S |
| 8.40 | 10.52 | (1 0 2) | w |
| 10.19 | 8.68 ± 0.08 | (1 1 0) | S |
| 11.06 | 7.99 | (1 0 3) | mS |
| 11.78 | 7.51 | (2 0 0) | mS |
| 11.95 | 7.40 | (1 1 2) | mS |
| 13.49 | 6.56 | (2 0 2) | vw |
| 15.06 | 5.88 ± 0.05 | (2 0 3) | w |
| 15.58 | 5.68 | (0 0 5) | S |
| 15.89 | 5.57 | (2 1 1) | w |
| 16.73 | 5.29 | (1 0 5) | w |
| 17.18 | 5.16 | (2 0 4) | S |
| 18.22 | 4.87 | (2 1 3) | w |
| 18.79 | 4.72 | (1 1 5) | w |
| 19.67 | 4.51 | (1 0 6) | w |
| 20.45 | 4.34 | (2 2 0) | mS |
| 22.22 | 4.00 | (3 1 2) | w |
| 22.75 | 3.91 | (1 0 7) | w |
| 23.30 | 3.82 | (3 1 3) | w |
| 23.66 | 3.76 | (3 0 5) | S |
| 24.75 | 3.59 | (3 1 4) | w |
| 25.83 | 3.45 | (2 2 5) | w |
| 26.52 | 3.36 | (2 1 5) | w |
| 27.16 | 3.28 | (4 1 0) | w |
| 28.77 | 3.103 ± 0.008 | (3 2 4) | w |
| 30.38 | 2.942 | (4 0 6) | vw |

TABLE II-continued

| 2θ (°) | $d_{hkl}(10^{-1} nM)$ | (h k l) | I/Io |
|---|---|---|---|
| 30.89 | 2.894 | (3 3 0) | w |
| 31.20 | 2.866 | (5 0 3) | w |
| 31.56 | 2.834 | (3 3 2) | vw |

The precursors of zeolites, which are produced during the crystallization stage of the process according to the invention and whose calcination produces the zeolites whose formulae were defined above, are crystalline aluminosilicates exhibiting an Si:Al ratio higher than 1 and capable of exceeding 3, which have either the cubic structure of the faujasite corresponding to an x-ray diffraction pattern comparable with that given in Table III or else the hexagonal structure of the faujasite hexagonal polytypes corresponding to an x-ray diffraction pattern comparable to that given in Table IV, or else include phases or domains exhibiting the structure of a cubic faujasite corresponding to an X-ray diffraction pattern comparable to that given in Table III and phases or domains exhibiting the structure of a hexagonal faujasite corresponding to an x-ray diffraction pattern comparable with that given in Table IV and which have cavities or channels trapping structurant molecules ST which are molecules MC or mixtures of molecules MC and of costructurant CS.

The precursors exhibiting the structure of cubic symmetry of faujasite can be denoted by a formula which, reduced to a unit cell of the cubic structure, is written as follows:

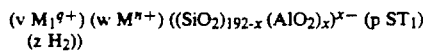

and in which $M_1^{q+}$, $M^{n+}$, x, v, w and z have the meanings given earlier, p is a number such that $4 \leq p \leq 10$ and $ST_1$ denotes a molecule of at least one compound $MC_1$ chosen from the carbon-containing macrorings containing from 10 to 17 atoms and carbon-containing macropolyrings containing 10 to 18 atoms in each ring, the said macrorings and macropolyrings additionally containing in the ring(s) heteroatoms chosen from O, S, N and Si, or of a mixture of at least one compound $MC_1$ and of a costructurant CS consisting of at least one compound of formula

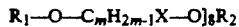

in which $R_1$, $R_2$, X, m and g have the meanings given above.

TABLE III

| 2θ (°) | $d_{hkl}(10^{-1} nM)$ | (h k l) | I/Io |
|---|---|---|---|
| 6.26 | 14.10 ± 0.2 | (1 1 0) | VS |
| 10.23 | 8.65 | (2 2 0) | w |
| 12.01 | 7.35 | (3 1 1) | mS |
| 15.77 | 5.615 ± 0.05 | (3 3 1) | S |
| 18.81 | 4.713 | (5 1 1) | m |
| 20.49 | 4.331 | (4 4 0) | mS |
| 22.93 | 3.875 | (6 2 0) | w |
| 23.77 | 3.740 | (5 3 3) | mS |
| 25.15 | 3.537 | (4 4 4) | vw |
| 25.93 | 3.433 | (5 5 1) | vw |
| 27.19 | 3.276 | (6 4 2) | mS |
| 27.93 | 3.191 ± 0.008 | (7 3 1) | vw |
| 29.81 | 2.994 | (7 3 3) | w |

TABLE IV

| 2θ (°) | $d_{hkl}(10^{-1} nM)$ | (h k l) | I/Io |
|---|---|---|---|
| 5.88 | 15.02 ± 0.2 | (1 0 0) | VS |
| 6.24 | 14.15 | (0 0 2) | S |
| 6.65 | 13.28 | (1 0 1) | S |
| 10.12 | 8.73 ± 0.08 | (1  ) | w |
| 11.01 | 8.03 | (1 0 3) | mw |
| 11.93 | 7.41 | (1 1 2) | mS |
| 13.58 | 6.515 | (2 0 2) | vw |
| 15.57 | 5.686 ± 0.05 | (0 0 5) | mS |
| 15.86 | 5.580 | (2 1 1) | mw |
| 16.70 | 5.305 | (1 0 5) | mw |
| 17.15 | 5.165 | (2 0 4) | S |
| 18.16 | 4.88 | (2 1 3) | mw |
| 18.71 | 4.74 | (1 1 5) | mw |
| 19.65 | 4.509 | (1 0 6) | mS |
| 20.42 | 4.345 | (2 2 0) | S |
| 22.14 | 4.011 | (3 1 2) | mS |
| 22.71 | 3.912 | (1 0 7) | mw |
| 23.32 | 3.811 | (3 1 3) | mw |
| 23.60 | 3.766 | (3 0 5) | mw |
| 24.68 | 3.604 | (3 1 4) | mw |
| 25.81 | 3.449 | (2 2 5) | w |
| 26.49 | 3.362 | (2 1 5) | w |

The precursors exhibiting the hexagonal symmetry structure of the hexagonal polytypes of faujasite can be represented by a formula which, reduced to a hexagonal unit cell of the crystalline structure, is written as follows:

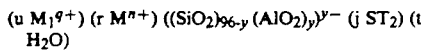

in which $M_1^{q+}$, $M^{n+}$, y, u, r and t have the meanings given earlier, j is a number such that $2 \leq j \leq 5$ and $ST_2$ denotes a molecule of at least one compound $MC_2$ chosen from carbon-containing macrorings whose ring contains heteroatoms chosen from O, N, Si and S and whose ring contains at least 18 atoms.

The molecules forming the structuring agents ST, $ST_1$ and $ST_2$ may be chosen especially from crown ethers whose ring contains at least four oxygen atoms, the compounds having a structure comparable to those of crown ethers but whose ring oxygen atoms are partially or wholly replaced by substituents chosen from sulphur atoms and $>NH$, $>NR$ and $>Si<_R^R$ groups in which R is a monovalent $C_1$–$C_4$ hydrocarbon radical or else from carbon-containing macropolyrings of the type of polyoxadiazabicycloalkanes in which each ring contains 10 to 18 atoms and has at least two oxygen atoms in addition to the two nitrogen atoms and also, in the case of the structuring agents ST and $ST_1$, from the associations of such molecules with molecules forming the costructurant CS. Molecules which are particularly suitable for forming the structuring agents ST, $ST_1$ and $ST_2$ are those referred to above explicitly for this purpose.

The zeolites obtained by the process according to the invention can be employed in applications of the same type as the zeolites of similar structure and of comparable or lower Si:Al ratio which are prepared by closely related or different methods.

Thus, the zeolites obtained according to the invention are suitable as an adsorbent for performing the selective adsorption of molecules whose dimensions are below 0.8 nM or else, after having been subjected to exchange reactions with various cations, as catalysts or components of catalysts which can be employed in catalytic conversion reactions of organic compounds and especially of hydrocarbon compounds. For example, the protonated form of the zeolite is obtained by an exchange treatment with ammonium cations followed by a calcination. This form, as well as those resulting from an exchange treatment with rare-earth cations such as lanthanum are suitable as acidic catalysts for hydrocracking petroleum chargers. The zeolites can also be subjected to exchange treatments with cations of metals of groups II to VIII of the Periodic Classification to form products which are suitable as catalysts for hydrocarbon conversion. For their application as catalysts, zeolites modified by exchange with cations endowing them with catalytic properties may be employed by themselves or in the form of composite products resulting from the mixing of these modified zeolites with other catalytically active products and/or with an amorphous matrix such as a silica gel or else a mixed gel of silica and of another oxide such as magnesia, alumina, titanium oxide or zirconium oxide, the said matrix being used, inter alia, to impart a better heat stability to the catalyst.

Composite catalysts associating one or more catalytically active zeolites with a matrix based on silica gel or a mixed gel of silica and of another oxide are particularly suitable for operations in a moving bed or in a fluidized bed, because they can be easily shaped, for example by spray-drying an aqueous suspension of the ingredients of which they are composed, into granules which have the dimensions required for these operations.

The following examples are given without any limitation being implied to illustrate the invention.

In these examples the quantities and percentages are given by weight unless shown otherwise.

EXAMPLE 1

Synthesis of a hexagonal polytype of faujasite

An aluminosilicate gel was prepared first of all by operating as follows in a vessel of appropriate capacity, the contents of the said vessel being kept stirred throughout the operation. 9 parts of water followed by 0.75 parts of sodium hydroxide NaOH were introduced into the vessel and, after the sodium hydroxide dissolved, 1.45 parts of 18-crown-6 ether were introduced. After the crown ether had dissolved completely, 1 part of a sodium aluminate containing 56% of $Al_2O_3$ and 37% of $Na_2O$ was then added to the contents of the vessel and the reaction mixture was heated slightly to dissolve the aluminate completely. After return to room temperature, 8.2 parts of a colloidal suspension of silica containing 40% of $SiO_2$ and 60% of water were then introduced into the vessel.

An aluminosilicate gel was thus obtained, whose molar composition, reduced to one mole of $Al_2O_3$, was the following:

10 $SiO_2$; 1 $Al_2O_3$; 2.8 $Na_2O$; 1 crown ether; 140 $H_2O$.

The gel obtained was subjected to a maturing operation at room temperature for 48 hours in a closed vessel.

The matured gel was then placed in an autoclave and kept in the latter at 110° C. for 96 hours to form a crystalline product. The crystals formed were separated off from the reaction medium by filtration and were then washed with distilled water to a low basicity (pH below 9) of wash liquors and were finally dried in an oven at approximately 60° C.

The dried crystals were then calcined at 600° C. for 4 hours in order to remove the molecules of the crown ether employed as structuring agent and to obtain the zeolite.

Before calcination the crystalline product has an x-ray diffraction pattern comparable to that given in Table IV.

The formula found for the said product, reduced to a unit cell of the structure, which is of hexagonal symmetry, is written:

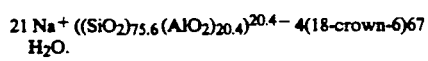
21 $Na^+$ $((SiO_2)_{75.6}(AlO_2)_{20.4})^{20.4-}$ 4(18-crown-6)67 $H_2O$.

The zeolite formed by calcining the above product has an x-ray diffraction pattern comparable to that in Table II characteristic of the calcined hexagonal polytypes of faujasite.

The formula found for this zeolite, reduced to a unit cell of the hexagonal skeleton, is written in the anhydrous state:

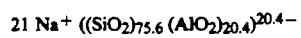
21 $Na^+$ $((SiO_2)_{75.6}(AlO_2)_{20.4})^{20.4-}$

A very slight excess of positive charge is found in relation to neutrality.

Approximately 80% of the silica used in the operation is found again in the skeleton of the zeolite.

EXAMPLE 2

Synthesis of a hexagonal polytype of faujasite

The procedure was as shown in Example 1, but with the following changes in the operating conditions:

| gel preparation | 0.48 parts of sodium hydroxide and 0.7 parts of 18-crown-6 ether |
|---|---|
| maturing | 24 hours at 20° C. |
| crystallization | 110° C. for 144 hours |
| calcination | 400° C. for 6 hours |

Before maturing, the aluminosilicate gel had the following molar composition, reduced to 1 mole of $Al_2O_3$: 10 $SiO_2$; 1 $Al_2O_3$; 2.2 $Na_2O$; 0.5 crown ether; 140 $H_2O$ Before calcination the crystalline product has an x-ray diffraction pattern comparable to that given in Table IV.

The formula found for the said product, reduced to a unit cell of the structure, which is of hexagonal symmetry, is written:

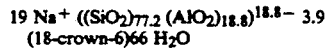
19 $Na^+$ $((SiO_2)_{77.2}(AlO_2)_{18.8})^{18.8-}$ 3.9 (18-crown-6)66 $H_2O$ The zeolite formed by calcining the above product exhibits an x-ray diffraction pattern comparable to that of Table II, characteristic of the calcined hexagonal polytypes of faujasite.

The formula found for this zeolite, reduced to a unit cell of the hexagonal structure, is written in the anhydrous state:

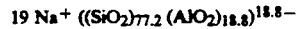
19 $Na^+$ $((SiO_2)_{77.2}(AlO_2)_{18.8})^{18.8-}$

Approximately 80% of the silica used in the operation is found again in the skeleton of the zeolite.

EXAMPLE 3

Synthesis of a hexagonal polytype of faujasite

The procedure was as shown in Example 1, but with the following changes in the operating conditions:

| gel preparation | 0.57 parts of sodium hydroxide, 1 part of 18-crown-6 ether and 0.25 parts of a cobalt acetate containing 24% of cobalt and 29% of water, the acetate being added after dissolving the crown ether and before adding the aluminate |
|---|---|
| maturing | 24 hours at room temperature |
| crystallization | 110° C. for 144 hours |
| calcination | 600° C. for 6 hours. |

Before maturing, the aluminosilicate gel had the following molar composition, reduced to 1 mole of $Al_2O_3$: 10 $SiO_2$; 1 $Al_2O_3$; 2.4 $Na_2O$; 0.7 crown ether; 0.1 CoO; 140 $H_2O$.

Before calcining, the crystalline product exhibits an X-ray diffraction pattern comparable with that given in Table IV.

The formula found for the said product, reduced to a unit cell of the structure, which is of hexagonal symmetry, is written:

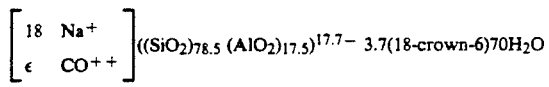

with $\epsilon = 0.1$ in this formula.

The zeolite formed by calcining the above precursor product exhibits an x-ray diffraction pattern comparable with that given in Table II, characteristic of the calcined hexagonal polytypes of faujasite.

The formula determined for this zeolite reduced to a unit cell of the hexagonal structure, is written in the anhydrous state:

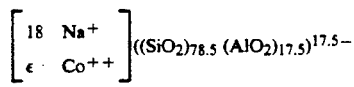

with $\beta < 0.1$ in this formula.

Approximately 90% of the silica used in the operation is found again in the skeleton of the zeolite.

EXAMPLE 4

Synthesis of a hexagonal polytype of faujasite

The procedure was as shown in Example 3, but with cobalt acetate replaced with 0.2 parts of silver nitrate and performing the calcination of the zeolite precursor at 400° C. for 6 hours.

Before maturing, the aluminosilicate gel had the following molar composition, reduced to 1 mole of $Al_2O_3$: 10 $SiO_2$; 1 $Al_2O_3$; 2.4 $Na_2O$; 0.5 crown ether; 0.1 $Ag_2O$; 140 $H_2O$ Before calcination the crystalline product exhibits an x-ray diffraction pattern comparable with that given in Table IV.

The formula determined for the said product, reduced to a unit cell of the structure, which is of hexagonal symmetry, is written

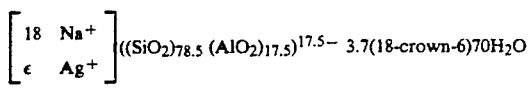

with $\epsilon < 0.1$ in this formula.

The zeolite formed by calcining the above precursor product exhibits an x-ray diffraction pattern comparable with that given in Table II, characteristic of the calcined hexagonal polytypes in faujasite.

The formula determined for this zeolite, reduced to a unit cell of the hexagonal structure, is written in the anhydrous state:

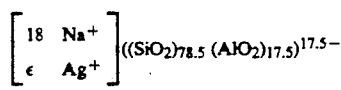

with $\epsilon < 0.1$ in this formula.

Approximately 90% of the silica used in the operation is found again in the skeleton of the zeolite.

EXAMPLE 5

Synthesis of a cubic faujasite

The procedure was as shown in Example 1, but with the following changes in the operating conditions:

| gel preparation | 0.66 parts of sodium hydroxide and 0.84 parts of 15-crown-5 ether |
|---|---|
| maturing | 24 hours at room temperature |
| crystallization | 100 hours at 110° C. |
| calcination | 400° C. for 4 hours. |

Before maturing, the aluminosilicate gel had the following molar composition, reduced to 1 mole of $Al_2O_3$: 10 $SiO_2$; 1 $Al_2O_3$; 2.6 $Ha_2O$; 0.7 crown ether; 140 $H_2O$.

Before calcination the crystalline product exhibits an X-ray diffraction pattern comparable with that given in Table III.

The formula determined for the said product, reduced to a unit cell of the structure, which is of cubic symmetry, is written:

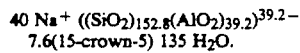

The zeolite formed by calcining the above product exhibits an X-ray diffraction pattern comparable to that of Table I, characteristic of the calcined cubic zeolites of the faujasite type.

The formula determined for this cubic zeolite, reduced to a unit cell of the cubic structure, is written in the anhydrous state:

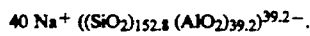

Approximately 80% of the silica used in the operation is found again in the skeleton of the zeolite.

EXAMPLE 6

Synthesis of a cubic faujasite

The procedure was as shown in Example 1, but with the following changes in the operating conditions

| gel preparation | 0.57 parts of sodium hydroxide and 1.2 parts of 15-crown-5 ether |
|---|---|
| crystallization | 192 hours at 115° C. |
| calcination | 500° C. for 4 hours. |

Before maturing, the aluminosilicate gel had the following molar composition, reduced to 1 mole of Al₂O₃: 10 SiO₂; 1 Al₂O₃; 2.4 Na₂O; 1 crown ether; 140 H₂O.

Before calcination the crystalline product exhibits an X-ray diffraction pattern comparable with that given in Table III corresponding to a structure of cubic symmetry.

The formula determined for the said product, reduced to a unit cell of the cubic structure, is written:

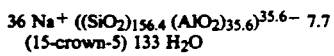
(15-crown-5) 133 H₂O

The zeolite formed by calcining the above product exhibits an X-ray diffraction pattern comparable with that of Table I, characteristic of the calcined cubic zeolites of the faujasite type.

The formula determined for this cubic zeolite, reduced to a unit cell of the cubic structure, is written in the anhydrous state:

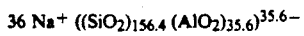

Approximately 85% of the silica used in the operation is found again in the skeleton of the zeolite.

EXAMPLE 7

Synthesis of a cubic faujasite

An aluminosilicate gel was prepared first of all by operating as follows in a glass vessel of suitable capacity, the contents of the said vessel being kept stirred throughout the operation. Into the vessel were introduced 1.8 parts of distilled water, 0.12 parts of a sodium aluminate containing 56% of Al₂O₃ and 37% of Na₂O, 0.3 parts of a macropolyring marketed under the name "Kryptofix 2.2.2" and 0.12 parts of sodium hydroxide. When the contents of the vessel were clear in appearance, 1.64 parts of a colloidal suspension of silica containing 40% of SiO₂ and 60% of water were then added slowly thereto.

An aluminosilicate gel was thus obtained, whose molar composition, reduced to 1 mole of Al₂O₃, was the following: 10 SiO₂; 1 Al₂O₃; 2.4 Na₂O; 0.7 macropolyring; 140 H₂O The gel obtained was subjected to a maturing operation of 24 hours at ambient temperature in a closed vessel.

The matured gel was then placed in an autoclave and kept in the latter at 115° C. for 10 days to form a crystalline product. The resulting product was separated off from the reaction medium by filtration and was then washed with distilled water until the wash liquors had a pH below 9 and was finally dried in an oven at approximately 60° C.

The product obtained consisted of a mixture of a crystalline phase and an amorphous phase.

The crystalline phase exhibits an x-ray diffraction spectrum corresponding to that of a faujasite of cubic symmetry and rich in silicon, the Si:Al ratio of the said crystalline phase being approximately 4. The crystals making up this crystalline phase are isometric entities of 3 to 7 μm exhibiting no extraction.

EXAMPLE 8

Synthesis of a cubic faujasite

An aluminosilicate gel was prepared by proceeding as described in Example 1, but using only 0.66 parts of sodium hydroxide and replacing the 18-crown-6 ether with 1.61 parts of dimethylsila-17-crown-6 ether.

The gel obtained was subjected to a maturing operation for 24 hours at 25° C.

The matured gel was then placed in an autoclave and kept in the latter at 115° C. for 6 days for the purpose of crystallization. The resulting product was then separated off from the reaction medium by filtration and was then washed with distilled water until the wash liquors had a pH below 9 and was finally dried in an oven at approximately 60° C.

The product obtained consisted of a mixture of a crystalline phase and an amorphous phase.

After calcination at 600° C. for 4 hours, the crystalline phase exhibits an x-ray diffraction spectrum comparable with that given in Table I, characteristic of a faujasite of cubic symmetry, the Si:Al ratio of the said crystalline phase being approximately 4.

Example 9

Synthesis of a hexagonal polytype of faujasite

The procedure was as shown in Example 1, but with the following changes in the operating conditions:

| gel preparation | 0.84 parts of sodium hydroxide, 1 part of 18-crown-6 ether and 9.9 parts of the silica suspension |
|---|---|
| maturing | 24 hours at room temperature with stirring |
| crystallization | 15 days at 115° C. |

Before maturing, the aluminosilicate gel had the following molar composition, reduced to 1 mole of Al₂O₃: 12 SiO₂; 1 Al₂O₃; 3.8 Na₂O; 0.7 crown ether; 140 H₂O The crystalline product was in the form of more or less spherical crystals 10 to 13 μm in diameter.

Before calcination the crystalline product exhibits an x-ray diffraction pattern comparable with that given in Table IV.

The formula found for the said product, reduced to a unit cell of the structure, which is of hexagonal symmetry, is written:

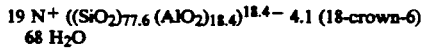
68 H₂O

The zeolite formed by calcining the above product exhibits an x-ray diffraction pattern comparable with that of Table II, characteristic of the calcined hexagonal polytypes of faujasite.

The formula found for this zeolite, reduced to a unit cell of the hexagonal structure, is written in the anhydrous state:

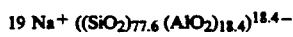

Approximately 85% of the silica used in the operation is found again in the skeleton of the zeolite, whose Si:Al ratio is approximately 4.3.

EXAMPLE 10

Synthesis of a hexagonal polytype of faujasite with the use of crystallization seeds An aluminosilicate gel was prepared by proceeding as shown in Example 1, but using 0.48 parts of sodium hydroxide and 1 part of 18-crown-6 ether.

The gel obtained had the following molar composition, reduced to 1 mole of $Al_2O_3$:

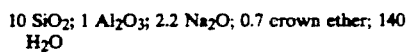
10 $SiO_2$; 1 $Al_2O_3$; 2.2 $Na_2O$; 0.7 crown ether; 140 $H_2O$

The abovementioned gel was subjected to a maturing operation for 5 hours at 25° C.

The seeds were prepared separately by grinding finely crystals of the calcined hexagonal polytype obtained in Example 1. 0.2 parts of the seeds obtained, to which 0.3 parts of sodium hydroxide had been added were then added to the matured gel.

The mixture thus produced was then kept in an autoclave heated to 115° C. for a period of 55 hours for the purpose of crystallization.

The crystals obtained were separated off from the reaction medium and were then washed, dried and calcined as shown in Example 1.

Before calcination the crystalline product exhibits an x-ray diffraction pattern comparable with that given in Table IV.

The formula found for the said product, reduced to a unit cell of the structure, which is of hexagonal symmetry, is written:

$$19\ Na^+\ ((SiO_2)_{77.3}(AlO_2)_{18.7})^{18.7-}\ 3.9\ (18\text{-crown-}6)\ 67\ H_2O.$$

The zeolite formed by calcining the above product exhibits an x-ray diffraction pattern comparable with that given in Table II, characteristic of the calcined hexagonal polytypes of faujasite.

Approximately 90% of the silica used in the operation is found again in the skeleton of the zeolite.

EXAMPLE 11

Use of a structuring agent consisting of a mixture of 15-crown-5 and 18-crown-6 ethers An aluminosilicate gel was prepared first of all by proceeding as follows in a vessel of suitable capacity, the contents of the said vessel being kept stirred throughout the operation.

10 parts of water and then 0.3 parts of 18-crown-6 ether were introduced into the vessel and, after the said crown ether had dissolved completely, 0.5 parts of 15-crown-5 ether were added. After dissolving of the second crown ether, 1 part of a sodium aluminate containing 56% of $Al_2O_3$ and 37% of $Na_2O$ was then added to the contents of the vessel and the reaction mixture was heated slightly to dissolve the aluminate completely. After return to room temperature, 8.2 parts of a colloidal suspension of silica containing 40% of $SiO_2$ and 60% of water were then introduced into the vessel.

An aluminosilicate gel was thus obtained, whose molar composition, reduced to one mole of $Al_2O_3$, was the following:

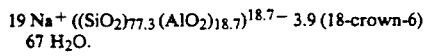
10 $SiO_2$; 1 $Al_2O_3$; 2.4 $Na_2O$; 0.2 18-crown-6; 0.4 15-crown-5; 140 $H_2O$.

The gel obtained was subjected to a maturing operation at room temperature for 24 hours in a closed vessel. The matured gel was then placed in an autoclave and kept in the latter at 115° C. for 192 hours to form a crystalline product. The crystals formed were separated off from the reaction medium by filtration and were then washed with distilled water to a low basicity (pH below 9) of the washed liquors and were finally dried in an oven at approximately 60° C.

The dried crystals were then calcined at 600° C. for 4 hours in order to remove the molecules of the crown ethers employed as structuring agent and to obtain the zeolite.

Before calcination the crystalline product is a zeolitic precursor of the faujasite type, which consists of a product made up of domains which have a structure of cubic symmetry and of domains which have a structure of hexagonal symmetry. The coefficient $\alpha$, measured by x-ray diffraction, is equal to 0.2.

The formula found for the said product, reduced to a cubic unit cell of 192 tetrahedra, is written 36.2 $Na^+$ $((SiO_2)_{156.5}(AlO_2)_{35.5})^{-35.5}$ 1.3 (18-crown-6) 6.2 (15-crown-5) 139 $H_2O$ The zeolite formed by calcining the above precursor product is also a product made up of domains corresponding to a cubic faujasite and of domains corresponding to a hexagonal faujasite. The measured coefficient $\alpha$ is equal to 0.2. The formula determined for this zeolite, reduced to a cubic unit cell of 192 tetrahedra, is written in the anhydrous state

$$36.2\ Na^+\ ((SiO_2)_{156.5}(AlO_2)_{35.5})^{-35.5}$$

Approximately 80% of the silica used is found again in the skeleton of the zeolite.

EXAMPLE 12

Use of a structuring agent consisting of a mixture of 15-crown-5 and 18-crown-6 ethers By proceeding in conditions similar to those of Example 11, an aluminosilicate gel was prepared which, before maturing, had the following molar composition, reduced to 1 mole of $Al_2O_3$:

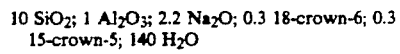
10 $SiO_2$; 1 $Al_2O_3$; 2.2 $Na_2O$; 0.3 18-crown-6; 0.3 15-crown-5; 140 $H_2O$ The gel was then treated as described in Example 11 to produce the zeolite.

Before calcination the crystalline product is a zeolitic precursor of faujasite type, which consists of a product make up of domains which have a structure of cubic symmetry and of domains which have a structure of hexagonal symmetry. The measured coefficient $\alpha$ has a value equal to 0.6.

The formula determined for this zeolitic precursor, reduced to a cubic unit cell of 192 tetrahedra, is the following:

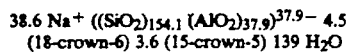
$$38.6\ Na^+\ ((SiO_2)_{154.1}(AlO_2)_{37.9})^{37.9-}\ 4.5\ (18\text{-crown-}6)\ 3.6\ (15\text{-crown-}5)\ 139\ H_2O$$

The zeolite formed by calcining the above precursor product is also a product made up of domains corresponding to a cubic faujasite and of domains corresponding to a hexagonal faujasite. The measured coefficient $\alpha$ has a value equal to 0.6.

The formula determined for this zeolite, reduced to a cubic unit cell of 192 tetrahedra, is written in the anhydrous state:

$$38.6\ Na^+[(SiO_2)_{154.1}(AlO_2)_{37.9}]^{37.9-}$$

EXAMPLE 19

Use of a structuring agent consisting of a mixture of 18-crown-6 and 15-crown-5 ethers By proceeding in conditions similar to those of Example 11, an aluminosilicate gel was prepared which, before maturing, had the following molar composition, reduced to 1 mole of $Al_2O_3$:

10 $SiO_2$; 1 $Al_2O_3$; 2.4 $Na_2O$; 0.4 18-crown-6; 0.2 15-crown-5; 140 $H_2O$ The gel was then treated as shown in Example 11 to produce the zeolite.

Before calcination the crystalline product is a zeolitic precursor of faujasite type, which consists of a product made up of domains which have a structure of cubic symmetry and of domains which have a structure of hexagonal symmetry. The measured coefficient α has a value equal to 0.8.

The formula determined for this zeolitic precursor, reduced to a cubic unit cell of 192 tetrahedra, is the following:

$$35.6\ Na^+[(SiO_2)_{157.3}(AlO_2)_{34.7}]^{34.7-}$$
$$6.7(18\text{-crown-}6)\ 1.4(15\text{-crown-}5)\ 129\ H_2O$$

The zeolite formed by calcining the above precursor product is also a product made up of domains corresponding to a cubic faujasite and of domains corresponding to a hexagonal faujasite. The measured coefficient α is equal to 0.8.

The formula determined for this zeolite, reduced to a cubic unit cell of 192 tetrahedra, is written in the anhydrous state $$36.6\ Na^+[(SiO_2)_{157.3}(AlO_2)_{34.7}]^{34.7-}$$

EXAMPLE 14

Use of a structuring agent consisting of a mixture of 18-crown-6 and 12-crown-4 ethers By proceeding in conditions similar to those of Example 11, an aluminosilicate gel was prepared which, before maturing, had the following molar composition, reduced to 1 mole of $Al_2O_3$:

10 $SiO_2$; 1 $Al_2O_3$; 2.3 $Na_2O$; 0.2 18-crown-6; 0.4 12-crown-4; 140 $H_2O$ The gel was then treated as shown in Example 11 to produce the zeolite, but by resorting to a maturing operation of 24 hours at 20° C. and to a crystallization of 12 days at 100° C.

Before calcination the crystalline product is a zeolitic precursor of the faujasite type, which consists of a product made up of domains which have a structure of cubic symmetry and of domains which have a structure of hexagonal symmetry. The measured coefficient α has a value of 0.55.

The formula determined for this zeolitic precursor, reduced to a cubic unit cell of 192 tetrahedra, is the following:

$$37.2\ Na^+[(SiO_2)_{156.5}(AlO_2)_{35.5}]^{35.5-}5.9(18\text{-crown-}6)\ 2.4\ (12\text{-crown-}4)\ 140\ (H_2O)$$

The zeolite formed by calcining the above precursor product is also a product exhibiting domains corresponding to a cubic faujasite and domains corresponding to a hexagonal faujasite. The measured coefficient α has a value equal to 0.55.

The formula determined for this zeolite, reduced to a cubic unit cell of 192 tetrahedra, is written in the anhydrous state $$37.2\ Na^+[(SiO_2)_{156.5}(AlO_2)_{35.5}]^{35.5-}$$

EXAMPLE 15

Use of a structuring agent consisting of a mixture of 15-crown-5 ether and of "PEO$_{200}$"

By proceeding as shown in Example 11, but using a structuring agent made up of equimolar quantities of 15-crown-5 ether and of an acyclic costructurant referred to by the abbreviation of "PEO$_{200}$" and consisting of the monomethyl ether of a polyoxyethylene glycol of number-average molecular mass Mn equal to 200, an alumino-silicate gel was prepared which, before maturing, had the following composition, reduced to one mole of $Al_2O_3$: 10 $SiO_2$; 1 $Al_2O_3$; 2.3 $Na_2O$; 0.2 15-crown-5; 0.2 PEO$_{200}$; 140 $H_2O$ The gel was then treated as shown in Example 11 to produce the zeolite, but with the maturing operation being carried out at 25° C. for 24 hours and the crystallization at 100° C. for 12 days.

Before calcination, the crystalline product is a zeolitic precursor of faujasite type, exhibiting a structure of cubic symmetry.

The formula determined for this zeolitic precursor, reduced to a cubic unit cell of 192 tetrahedra, is the following:

$$38.1\ Na^+[(SiO_2)_{155}(AlO_2)_{37}]^{37-}5.6(15\text{-crown-}5)2(PEO_{200})153\ H_2O$$

The zeolite formed by calcining the above precursor product is a zeolite of faujasite type exhibiting a structure of cubic symmetry.

The formula determined for this zeolite, reduced to a cubic unit cell of 192 tetrahedra, is written in the anhydrous state $$38.1\ Na^+[(SiO_2)_{155}(AlO_2)_{37}]^{37-}$$

Approximately 85% of the silica used is found again in the skeleton of the zeolite.

EXAMPLE 16

Use of a structuring agent consisting of a mixture of 15-crown-5 ether and ethylene glycol By proceeding as shown in Example 11, but using a structuring agent made up of a mixture of 15-crown-5 ether and of an acyclic costructurant referred to by the abbreviation of "EG" and consisting of ethylene glycol, an aluminosilicate gel was prepared which, before maturing, had the following composition, reduced to 1 mole of $Al_2O_3$:

10 $SiO_2$; 1 $Al_2O_3$; 2.2 $Na_2O$; 0.2 15-crown-5; 2 EG; 140 $H_2O$

The gel was then treated as shown in Example 11 to produce the zeolite, the maturing being performed, however, at 20° C. for 24 hours and the crystallization at 100° C. for 12 days.

Before calcination the crystalline product is a zeolitic precursor of the faujasite type, exhibiting a structure of cubic symmetry.

The formula determined for this zeolitic precursor, reduced to a cubic unit cell of 192 tetrahedra, is the following:

$$38.5 \, Na^+ \, [(SiO_2)_{155.1} \, (AlO_2)_{36.8}]^{36.8-}$$
$$5.4(15\text{-crown-}5) \, 1.7(EG) \, 152 \, (H_2O)$$

The zeolite formed by calcining the above precursor product is a zeolite of faujasite type, exhibiting a structure of cubic symmetry.

The formula determined for this zeolite, reduced to a cubic unit cell of 192 tetrahedra, is written in the anhydrous state $$38.5 \, Na^+[(SiO_2)_{155.1} \, (AlO_2)_{36.8}]^{36.8-}$$

EXAMPLE 17

Use of a structuring agent consisting of a mixture of 18-crown-6 ether and ethylene glycol By proceeding as shown in Example 11, but using a structuring agent made up of a mixture of 18-crown-6 ether and of an acyclic costructurant referred to by the abbreviation of "EG" and consisting of ethylene glycol, an aluminosilicate gel was prepared which, before maturing, had the following composition, reduced to 1 mole of $Al_2O_3$:

10 $SiO_2$; 1 $Al_2O_3$; 2.2 $Na_2O$; 0.2 18-crown-6; 2 EG; 140 $H_2O$

The gel was then treated as shown in Example 11 to produce the zeolite, the maturing being performed, however, at 25° C. for 24 hours and the crystallization at 100° C. for 12 days.

Before calcination, the crystalline product is a zeolitic precursor of the faujasite type, made up of domains which have a structure of cubic symmetry and of domains which have a structure of hexagonal symmetry.

The measured coefficient α has a value equal to 0.85. The Si:Al ratio of the skeleton of the said precursor, determined by NMR of silicon 29 with rotation at the magic angle, is close to 4.

The zeolite obtained by calcining the above precursor product is a zeolite of the faujasite type, exhibiting domains corresponding to cubic faujasite and domains corresponding to a hexagonal faujasite. The measured coefficient α has a value equal to 0.85. The Si:Al ratio of the skeleton of the zeolite, determined by NMR of silicone 29 with rotation at the magic angle, is close to 4.

EXAMPLE 18

Use of a structuring agent consisting of a mixture of 18-crown-6 ether and of "$PEO_{350}$"

By proceeding as shown in Example 11, but using a structuring agent made up of a mixture of 18-crown-6 ether and of a costructurant referred to by the abbreviation of "$PEO_{350}$" and consisting of the monomethyl ether of a polyoxyethylene glycol of number-average molecular mass Mn equal to 350, an aluminosilicate gel was prepared which, before maturing, had the following composition, reduced to 1 mole of $Al_2O_3$:

10 $SiO_2$; 1 $Al_2O_3$; 2.3 $Na_2O$; 0.2 18-crown-6; 0.2 $PEO_{350}$; 140 $H_2O$ The gel was then treated as shown in Example 11 to produce the zeolite, the maturing being performed, however, at 20° C. for 24 hours and the crystallization at 100° C. for 12 days.

Before calcination, the crystalline product is a zeolitic precursor of the faujasite type, made up of domains which have a structure of cubic symmetry and of domains which have a structure of hexagonal symmetry. The measured coefficient α is close to 0.8.

The zeolite formed by calcining the above precursor product is a zeolite of the faujasite type exhibiting domains corresponding to a cubic faujasite and domains corresponding to a hexagonal faujasite. The measured coefficient α is close to 0.8. The Si:Al ratio of the skeleton of the zeolite, determined by NMR of silicon 29 with rotation at the magic angle, is close to 4.

We claim:

1. A process for the preparation of zeolites belonging to the faujasite structural class and exhibiting a Si:Al ratio higher than 1, said process comprising first forming a reaction mixture which has a pH higher than 10 and contains water, a source of tetravalent silicon, a source of trivalent aluminum, a source of hydroxide ions in the form of a strong inorganic or organic base and a structural agent ST so as to produce an alumino silicate gel having the composition to permit its crystallization into a compound of the faujasite structural class, and the gel obtained is then kept at a temperature not exceeding 150° C. and at a pressure of at least equal to the autogenous pressure of said gel for a sufficient period to effect the crystallization of said gel into a precursor of the zeolite consisting of the zeolite with the structural agent ST trapped in its cavities and said precursor is subjected to a calcination to destroy said structuring agent ST and to produce the zeolite, and wherein the structuring agent ST consists of at least one compound MC selected from the group consisting of carbon-containing macrorings and macropolyrings which contain in the rings heteroatoms selected from the group consisting of oxygen, nitrogen, silicon, and sulfur, and which contain 10 to 24 atoms per ring.

2. The process according to claim 1, wherein the quantity of structuring agent ST in the reaction mixture intended to form the gel is such as to make the molar ratio $ST:Al^{III}$ ranged from 0.1 to 4.

3. The process according to claim 1, wherein the ingredients making up the reaction mixture giving rise to the aluminosilicate gel are employed in such quantities as to give said gel, in terms of molar ratios, a composition such that $Si^{IV}:Al^{III}=2$ to 20, $OH:Al^{III}=0.5$ to 8, $ST:Al^{III}=0.1$ to 4 and $H_2O:Al^{III}=40$ to 200.

4. The process according to claim 3, wherein said composition is such that $Si^{IV}:Al^{III}=4$ to 10, $OH^-:Al^{III}=1$ to 6, $ST:Al^{III}=0.1$ to 1 and $H_2O:Al^{III}=50$ to 150.

5. The process according to claim 1, wherein the structuring agent ST consists of at least one compound MC chosen from the group consisting of a) crown ethers whose ring contains 10 to 24 atoms and comprises solely oxygen atoms as heteroatoms, at least 4 in number, b) compounds derived from the crown ethers defined under a) by partial or complete replacement of the oxygen atoms in the ring by substituents chosen from sulphur atoms and the groups >NH, >NR and >Si<$R_R{}^R$ in which R is a $C_1$-$C_4$ hydrocarbyl radical, and c) the carbon-containing macropolyrings chosen from polyoxadiazabicycloalkanes in which each ring contains 10 to 18 atoms and has at least two oxygen atoms in addition to the two nitrogen atoms.

6. The process according to claim 1, wherein the structuring agent ST results from the association of at least one compound MC with a costructurant CS consisting of at least one oxygen-containing acyclic compound chosen from the compounds of formula $$R_1-O-C_mH_{2m-1}X-O)_gR_2$$

in which each of $R_1$ and $R_2$, which are identical or different, denotes a hydrogen atom or a $C_1$-$C_4$ alkyl radical, X denotes a hydrogen atom or an OH radical, m is equal to 2 or 3 and may be different from one repeat unit to another and g is a number ranging from 1 to 12.

7. The process according to claim 6, wherein the costructurant CS consists of at least one compound chosen from ethylene glycol methyl ether, ethylene glycol dimethyl ether, ethylene glycol, propylene glycol, polyethylene glycols of formula HO—$CH_2CH_2$-$H_2O)_{g1}$H and their methyl ethers of formula $CH_3O$—$CH_2CH_2O)_{g1}$H and polypropylene glycols of formula OH—$CH_2CH_2CH_2O)_{g1}$H with $g_1$ denoting a number ranging from 2 to 9 in these formulae.

8. The process according to claim 6, wherein the quantity of structuring agent resulting from the association of at least one compound MC and of the costructurant CS, which is present in the reaction mixture intended to form the gel and the composition of said structuring agent are such as to make the molar ratio structuring agent: $Al^{III}$ range from 0.1 to 4 and so as to make the molar ratio MC:$Al^{III}$ equal to or higher than 0.05.

9. The process according to claim 8, wherein the quantity of structuring agent and its composition are such as to make the molar ratio structuring agent: $Al^{III}$ range from 0.2 and 2 and so as to make the molar ratio MC:$Al^{III}$ equal to or higher than 0.1.

10. The process according to claim 1, wherein the structuring agent consists of at least one compound $MC_1$ chosen from the compounds MC which are macrorings which have 10 to 17 atoms in the ring or macropolyrings which have 10 to 18 atoms in each ring, so as to obtain a zeolite which has the faujasite structure of cubic symmetry.

11. The process according to claim 6, wherein the structuring agent results from the association of a costructurant CS with at least one compound $MC_1$ chosen from the compounds MC which are macrorings which have 10 to 17 atoms in the ring or macropolyrings which have 10 to 18 atoms in each ring, so as to obtain a zeolite which has the faujasite structure of cubic symmetry.

12. The process according to claim 1, wherein the structuring agent consists of at least one compound $MC_2$ chosen from the compounds MC which are macrorings containing at least 18 atoms in the ring, so as to obtain a zeolite which has the hexagonal symmetry structure of the hexagonal polytypes of faujasite.

13. The process according to claim 1, wherein the source of tetravalent silicon is chosen from the group consisting of finely divided silicas in the form of hydrogels, aerogels or colloidal suspensions, water-soluble silicates such as alkali metal silicates like sodium silicate, and hydrolysable silicic esters such as tetraalkyl orthosilicates of formula Si(OR)$_4$ in which R denotes a $C_1$-$C_4$ alkyl radical.

14. The process according to claim 1, wherein the source of trivalent aluminum is selected from the group consisting of aluminum salts, aluminum oxides and hydroxides and aluminates.

15. The process according to claim 1, wherein the source of hydroxide ions is selected from the group made up of hydroxides of the alkali metals of group IA of the Periodic Classification of the Elements, the hydroxides of the alkaline-earth metals Ca, Sr and Ba and quaternary ammonium hydroxides.

16. The process according to claim 1, wherein the reaction mixture contains cations $M^{n+}$ of at least one metal M, of valency n, other than the metals whose hydroxides are strong bases, in an overall quantity such as to make the molar ratio $M^{n+}$:$Al^{III}$ in said mixture not exceed 0.4.

17. The process according to claims 1 to 16, wherein before proceeding to crystallize the gel, crystallization seeds are added to the reaction mixture intended to form said gel, in a quantity ranging from 0.1% to 10% by weight of said reaction mixture.

18. The process according to claim 1, wherein before proceeding to crystallize the gel, said gel is subjected to a maturing operation, in a closed vessel, at a temperature below the crystallization temperature for a period ranging from approximately 6 hours to approximately 6 days.

19. The process according to claim 1, wherein the crystallization of the alumino-silicate gel, with or without seed, is carried out by keeping the said gel at a temperature ranging from 90° C. to 120° C. for a period of between 2 hours and fifteen days.

20. The process according to claim 1, wherein the calcination of the zeolite precursor is carried out at a temperature above 300° C.

21. Precursors of zeolites of the faujasite structural class, consisting of aluminosilicates which have a Si:Al ratio higher than 1 and which, on the one hand, exhibit a structure of cubic symmetry comparable with that of faujasite or else a structure of hexagonal symmetry comparable with that of the hexagonal polytypes of faujasite or else comprise domains exhibiting a structure of cubic symmetry comparable to that of faujasite and domains exhibiting a structure of hexagonal symmetry comparable with that of the hexagonal polytypes of faujasite, and have cavities or channels trapping molecules of a structuring agent, ST, wherein the structuring agent ST consists of at least one compound MC, chosen from the group consisting of carbon-containing macrorings and macropolyrings which contain in the rings heteroatoms chosen from O, N, Si and S and which contain 10 to 24 atoms per ring, or results from the association of at least one compound MC with a costructurant CS consisting of at least one oxygen-containing acyclic compound chosen from the compounds of formula $R_1$—O—$C_mH_{2m-1}$X—O]$_g$$R_2$, in which each of $R_1$ and $R_2$, which are identical or different, denotes a hydrogen atom or a $C_1$-$C_4$ alkyl radical, X denotes a hydrogen atom or an OH radical, m is equal to 2 or 3 and may be different from one repeat unit to the other and g is a number ranging from 1 to 12.

22. Precursors according to claim 21, wherein the compound(s) MC contained in the structuring agent ST are selected from the group consisting of a) crown ethers whose ring contains 10 to 24 atoms and comprises solely oxygen atoms as heteroatoms, at least 4 in number, b) the compounds derived from the crown ethers defined under a) by partial or complete replacement of the oxygen atoms of the ring by substituents chosen from sulphur atoms and the groups >NH, >NR and >Si<$R_R{}^R$, in which R is a $C_1$-$C_4$ hydrocarbyl radical, and c) the carbon-containing macropolyrings chosen from polyoxadiazabicycloalkanes in which each ring contains 10 to 18 atoms and has at least two oxygen atoms in addition to the two nitrogen atoms.

23. Precursors according to claim 21, wherein in addition to the compound(s) MC, the structuring agent ST also contains a costructurant CS consisting of at least on compound chosen from ethylene glycol methyl ether, ethylene glycol dimethyl ether, ethylene glycol, propylene glycol, polyethylene glycols of formula HO—$CH_2CH_2O)_{g1}$H and their methyl ethers of formula $CH_3$—O—$CH_2CH_2O)_{g1}$H and propylene glycols of formula HO—$CH_2CH_2CH_2O)_{g1}$H with $g_1$ denoting a number ranging from 2 to 9 in these formulae.

24. The process of claim 1 wherein the Si:Al ratio is greater than 3.

25. The process according to claim 14, wherein the source of trivalent aluminium is selected from the group consisting of alkali metal aluminates and aluminium trialkoxides of formula Al(OR)$_3$ in which R is $C_1$-$C_4$ alkyl radical.

26. The process according to claim 16, wherein said cations $M^{n+}$ are selected from the group consisting of $Co^{++}$, $Cd^{++}$, $Mg^{++}$ and $Ag^+$.

27. The process according to claim 17 wherein the recrystallization seeds are produced by grinding a zeolite of the same kind as the crystalline phase to be produced or by synthesis from a suitable nucleating solution.

28. Precursors according to claim 21 exhibiting a structure of cubic symmetry comparable with that of faujasite, wherein they exhibit an x-ray diffraction pattern comparable with that defined in Table III

TABLE III

| 2θ (°) | $d_{hkl}$ ($10^{-1}$ nM) | (h k l) | I/Io |
|---|---|---|---|
| 6.26 | 14.10 ± 0.2 | (1 1 0) | VS |
| 10.23 | 8.65 | (2 2 0) | w |
| 12.01 | 7.35 | (3 1 1) | mS |
| 15.77 | 5.615 ± 0.05 | (3 3 1) | S |
| 18.81 | 4.713 | (5 1 1) | m |
| 20.49 | 4.331 | (4 4 0) | mS |
| 22.93 | 3.875 | (6 2 0) | w |
| 23.77 | 3.740 | (5 3 3) | mS |
| 25.15 | 3.537 | (4 4 4) | vw |
| 25.93 | 3.433 | (5 5 1) | vw |
| 27.19 | 3.276 | (6 4 2) | mS |
| 27.93 | 3.191 ± 0.008 | (7 3 1) | vw |
| 29.81 | 2.994 | (7 3 3) | w | and are represented by a formula which, reduced to a unit cell of the cubic structure, is written

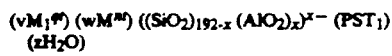

(zH$_2$O)

and in which M1$^q$ denotes a q-valent cation of a metal selected from the group consisting of group IA of the Periodic Classification of the Elements (q=1), an alkaline-earth metal chosen from Ca, Sr and Ba (q=2), and a monovalent cation containing nitrogen (q=1) M$^{n+}$ denotes a cation of a metal M of valency n other than a cation M1$^{qt}$, x, z, v and w are numbers such that $30 \leq x \leq 96$, $z \geq 0$ and depending on the hydration state of the precursor, $0 < v \leq x/q$ and $0 \leq w \leq x/n$ with $qv + wn \geq x$, p is a number such that $4 \leq p \leq 10$ and ST$_1$ denotes at least one compound MC$_1$ selected from the compounds MC consisting of macrorings containing from 10 to 17 atoms in the ring or macropolyrings containing 10 to 18 atoms in each ring or a mixture of at least one compound MC$_1$ and of the constructurant CS.

29. Precursors according to claim 21, exhibiting a structure of hexagonal symmetry comparable with that of the hexagonal polytypes of faujasite, wherein they exhibit an x-ray diffraction pattern comparable with that given in Table IV below:

TABLE IV

| 2θ (°) | $d_{hkl}$ ($10^{-1}$ nM) | (h k l) | I/Io |
|---|---|---|---|
| 5.88 | 15.02 ± 0.2 | (1 0 0) | VS |
| 6.24 | 14.15 | (0 0 2) | S |
| 6.65 | 13.28 | (1 0 1) | S |
| 10.12 | 8.73 ± 0.08 | (1   ) | w |
| 11.01 | 8.03 | (1 0 3) | mw |
| 11.93 | 7.41 | (1 1 2) | mS |
| 13.58 | 6.515 | (2 0 2) | vw |
| 15.57 | 5.686 ± 0.05 | (0 0 5) | mS |
| 15.86 | 5.580 | (2 1 1) | mw |
| 16.70 | 5.305 | (1 0 5) | mw |
| 17.15 | 5.165 | (2 0 4) | S |
| 18.16 | 4.88 | (2 1 3) | mw |
| 18.71 | 4.74 | (1 1 5) | mw |
| 19.65 | 4.509 | (1 0 6) | mS |
| 20.42 | 4.345 | (2 2 0) | S |
| 22.14 | 4.011 | (3 1 2) | mS |
| 22.71 | 3.912 | (1 0 7) | mw |
| 23.32 | 3.811 | (3 1 3) | mw |
| 23.60 | 3.766 | (3 0 5) | mw |
| 24.68 | 3.604 | (3 1 4) | mw |
| 25.81 | 3.449 | (2 2 5) | w |
| 26.49 | 3.362 | (2 1 5) | w | and are represented by a formula which, reduced to a hexagonal unit cell of the crystalline structure, is written (u M1$^q$) (rM$^{n+}$)

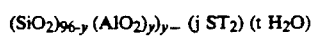

with, in this formula, M1$^{qt}$ denoting a q-valent cation of a metal selected from the group consisting of IA of the Periodic Classification of the Elements (q=1), an alkaline-earth metal chosen from Ca, Sr and Ba (q=2) and a monovalent cation containing nitrogen (q=1) M$^{nt}$ denoting a cation of a metal M of valency n other than a cation M1$^{qt}$, y, u, r and t being numbers such that $15 \leq y \leq 48$, $t \geq 0$ and depending on the hydration state of the precursor, $0 < u \leq y/q$ and $0 \leq r \leq y/n$ with $qu+n$ $r \geq y$, j being a number such that $2 \leq j \leq 5$ and ST$_2$ denoting at least one compound MC$_2$ chosen from the compounds MC which are macrorings containing at least 18 atoms in the ring.

30. A process for the preparation of zeolites which have the cubic symmetry structure of faujasite by calcination of the precursors of claim 38, the zeolites obtained having a cubic unit cell parameter value of between 2.4 and 2.5 nm, exhibiting an x-ray diffraction pattern comparable with that given in Table I below:

TABLE 1

| 2θ (°) | $d_{hkl}$ ($10^{-1}$ nM) | (hkl) | I/Io |
|---|---|---|---|
| 6.245 | 14.14 ± 0.2 | (1 1 1) | VS |
| 10.205 | 8.66 | (2 2 0) | S |
| 11.965 | 7.39 | (3 1 1) | mS |
| 15.735 | 5.627 ± 0.05 | (3 3 1) | S |
| 18.775 | 4.721 | (5 1 1) | w |

TABLE 1-continued

| 2θ (°) | $d_{hkl}(10^{-1}$ nM) | (hkl) | I/Io |
|---|---|---|---|
| 20.465 | 4.335 | (4 4 0) | mw |
| 22.895 | 3.881 | (6 2 0) | w |
| 23.755 | 3.727 | (5 3 3) | mS |
| 25.105 | 3.544 | (4 4 4) | vw |
| 25.965 | 3.428 | (5 5 1) | vw |
| 27.175 | 3.279 | (6 4 2) | mS |
| 27.885 | 3.196 ± 0.008 | (7 3 1) | vw |
| 29.765 | 2.999 | (7 3 3) | w | and corresponding to the formula which, reduced to unit cell of the cubic structure, is written

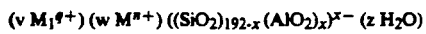

$$(v\ M_1^{q+})(w\ M^{n+})((SiO_2)_{192-x}(AlO_2)_x)^{x-}(z\ H_2O)$$

and in which, $M_1^{q'}$, $M^{n'}$, x,z,v and w have the meanings given in claim 37.

31. A process for the preparation of zeolites which have the hexagonal symmetry structure of the hexagonal polytypes of faujasite by calcination of the precursors of claim 29, the zeolites obtained having hexagonal unit cell parameters a,b,c, of the said structure such that 1.72 nm < a = b < 1.77 nm and 2.80 nm < c < 2.89 nm, exhibiting an x-ray diffraction pattern comparable with that given in Table II

| 2θ (°) | $d_{hkl}(10^{-1}$ nM) | (h k l) | I/Io |
|---|---|---|---|
| 5.88 | 15.03 ± 0.2 | (1 0 0) | VS |
| 6.23 | 14.2 | (0 0 2) | VS |
| 6.66 | 13.3 | (1 0 1) | S |
| 8.40 | 10.52 | (1 0 2) | w |
| 10.19 | 8.68 ± 0.08 | (1 1 0) | S |
| 11.06 | 7.99 | (1 0 3) | mS |
| 11.78 | 7.51 | (2 0 0) | mS |
| 11.95 | 7.40 | (1 1 2) | mS |
| 13.49 | 6.56 | (2 0 2) | vw |
| 15.06 | 5.88 ± 0.05 | (2 0 3) | w |
| 15.58 | 5.68 | (0 0 5) | S |
| 15.89 | 5.57 | (2 1 1) | w |
| 16.73 | 5.29 | (1 0 5) | w |
| 17.18 | 5.16 | (2 0 4) | S |
| 18.22 | 4.87 | (2 1 3) | w |
| 18.79 | 4.72 | (1 1 5) | w |
| 19.67 | 4.51 | (1 0 6) | w |
| 20.45 | 4.34 | (2 2 0) | mS |
| 22.22 | 4.00 | (3 1 2) | w |
| 22.75 | 3.91 | (1 0 7) | w |
| 23.30 | 3.82 | (3 1 3) | w |
| 23.66 | 3.76 | (3 0 5) | S |
| 24.75 | 3.59 | (3 1 4) | w |
| 25.83 | 3.45 | (2 2 5) | w |
| 26.52 | 3.36 | (2 1 5) | w |
| 27.16 | 3.28 | (4 1 0) | w |
| 28.77 | 3.103 ± 0.008 | (3 2 4) | w |
| 30.38 | 2.942 | (4 0 6) | vw |
| 30.89 | 2.894 | (3 3 0) | w |
| 31.20 | 2.866 | (5 0 3) | w |
| 31.56 | 2.834 | (3 3 2) | vw | and corresponding to a formula which, reduced to a unit cell of the hexagonal structure, is written

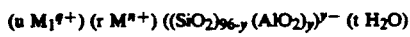

$$(u\ M_1^{q+})(r\ M^{n+})((SiO_2)_{96-y}(AlO_2)_y)^{y-}(t\ H_2O)$$

and in which the symbols $M_1^{q'}$, $M^{n'}$, y,t,u and r have the meanings given in claim 38.

32. A process for the preparation of precursors of zeolites belonging to the faujasite structural class and exhibiting a Si:Al ratio higher than 1, said process comprising first forming a reaction mixture which has a small pH higher than 10 and contains water, a source of tetravalent silicon, a source of trivalent aluminum, a source of hydroxide ions in the form of a strong inorganic or organic base and a structuring agent ST so as to produce an alumino silicate gel having the composition to permit its crystallization into a compound of the faujasite structural class, and the gel obtained is then kept at a temperature not exceeding 150° C. and under a pressure at least equal to the autogenous pressure of said gel for a sufficient period to effect crystallization of the gel into a precursor of the zeolite consisting of the zeolite with the structuring agent ST trapped in its cavities and consisting of at least one compound MC selected from the group consisting of the carbon-containing macrorings and macropolyrings which contain in the rings heteroatoms selected from the group consisting of oxygen, nitrogen, silicon and sulfur, and which contain 10 to 24 atoms per ring.

33. The process according to claim 32, wherein the quantity of structuring agent ST in the reaction mixture intended to form the gel is such as to make the molar ratio ST:Al$^{III}$ ranging from 0.1 to 4.

34. The process according to claim 32, wherein the ingredients making up the reaction mixture giving rise to the aluminosilicate gel are employed in such quantities as to give said gel, in terms of molar ratios, a composition such that SI$^{IV}$:Al$^{IIIII}$ = 2 to 20, OH$^-$:Al$^{III}$ = 0.5 to 8, ST:Al$^{III}$ = 0.1 to 4 and H$_2$O:Al$^{III}$ = 40 to 200.

35. The process according to claim 32, wherein the structuring agent ST consists of at least one compound MC chosen from the group consisting of a) crown ethers whose ring contains 10 to 24 atoms and comprises solely oxygen atoms as heteroatoms, at least 4 in number, b) compounds derived from the crown ethers defined under 1) by partial or complete replacement of the oxygen atoms in the ring by substituents chosen from sulphur atoms and the groups >NH, >NK and SI<$_R^R$ in which R is a C$_1$-C$_4$ hydrocarbyl radical, and c) the carbon-containing macropolyrings chosen from polyoxadiazabicycloalkanes in which each ring contains 10 to 18 atoms and has at least two oxygen atoms in addition to the two nitrogen atoms.

36. The process according to claim 32, wherein the structuring agent ST results from the association of at least one compound MC with a costructurant CS consisting of at least one oxygen-containing acyclic compound chosen from the compound of the formula

$$R_1-O-C_mH_{2m-1}X-O)_gR_2$$

in which each of R$_1$ and R$_2$, which are identical or different, denotes a hydrogen atom or a C$_1$-C$_4$ alkyl radical, X denotes a hydrogen atom or an OH radical, m is equal to 2 or 3 and may be different from one repeat unit to another and g is a number ranging from 1 to 12.

37. The process according to claim 36, wherein the quantity of structuring agent resulting from the association of at least one compound MC and of the costructurant CS, which is present in the reaction mixture intended to form the gel and the composition of the said structuring agent are such to make the molar ratio structuring agent:Al$^{III}$ range from 0.1 to 4 and so as to make the molar ratio MC:Al$^{III}$ equal to or higher than 0.05.

38. The process according to claim 32, wherein the structuring agent consists of at least one compound MC 1 chosen from the compounds MC which are macrorings which have 10 to 17 atoms in the ring or macropolyrings which have 10 to 18 atoms in each ring, so as to obtain a zeolite precursor which has the faujasite structure of cubic symmetry.

39. The process according to claim 36, wherein the structuring agent results from the association of a costructurant CS with at least one compound $MC_1$ chosen from the compounds MC which are macropolyrings which have 10 to 17 atoms in the ring or macropolyrings which have 10 to 18 atoms in each ring, so as to obtain a zeolite precursor which has the faujasite structure of cubic symmetry.

40. The process according to claim 32, wherein the structuring agent consists of at least one compound $MC_2$ chosen from the compound MC which are macrorings containing at least 18 atoms in the ring, so as to obtain a zeolite precursor which has the hexagonal symmetry structure of the hexagonal polytypes of faujasite.

41. The process according to claim 32, wherein the source of tetravalent silicon is chosen from the group consisting of finely divided silicas in the form of hydrogels, aerogels or colloidal suspensions, water-soluble silicates such as alkali metal silicates and hydrolysable silicic esters such as tetraalkyl orthosilicates of formula $Si(OR)_4$ in which R denotes a $C_1-C_4$ alkyl radical.

42. The process according to claim 41, wherein the source of trivalent aluminum is chosen from the group consisting of aluminium salts, aluminium oxides and hydroxides, aluminates and aluminium esters.

43. The process according to claim 32, wherein the source of hydroxide ions is chosen from the group consisting of hydroxides of the alkali metals of group IA of the Periodic Classification of the Elements, the hydroxides of the alkaline-earth metals Ca,Sr and Ba and quaternary ammonium hydroxides.

44. The process according to claim 32, wherein the reaction mixture contains cations $M^{n+}$ of at least one metal M, of valency n, other than the metals whose hydroxides are strong bases, in an overall quantity such as to make the molar ratio $M^{n+}:Al^{III}$ in said mixture not exceed 0.4.

45. The process according to claim 32, wherein before proceeding to crystallize the gel, crystallization seeds are added to the reaction mixture intended to form said gel, in a quantity ranging from 0.1% to 10% by weight of said reaction mixture.

46. The process according to claim 32, wherein before proceeding to crystallize the gel, said gel is subjected to a maturing operation, in a closed vessel, at a temperature below the crystallization temperature for a period ranging from approximately 6 hours to approximately 6 days.

47. The process according to claim 32, wherein the crystallization of the aluminosilicate gel, with or without seed, is carried out by keeping said gel at a temperature ranging from 90° C. to 120° C. for a period of between 2 hours and fifteen days.

* * * * *

UNITED STATES PATENT AND TRADEMARK OFFICE
CERTIFICATE OF CORRECTION

PATENT NO. : 5,098,686

DATED : March 24, 1992

INVENTOR(S) : Delprato et. al.

It is certified that error appears in the above-identified patent and that said Letters Patent is hereby corrected as shown below:

Col. 6, lines 25-27 change "$R_1-O-C_mH_{2m-1}X-O]_gR_2$" to

--$R_1-O\{C_mH_{2m-1}X-O\}_g-R_2$ --;

Col. 6, line 40 change: "$CH_3-O-CH_2CH_2O]_{g1}H$" to read

--$CH_3-O\{CH_2CH_2O\}_{g1}H$--;

Col. 6, line 41 change: "$OH-CH_2CH_2O]_{g1}H$" to read

--$OH\{CH_2CH_2O\}_{g1}H$--;

Col. 6, line 46 change: "$HO-CH_2CH_2CH_2O]_{g1}H$" to read

--$HO\{CH_2CH_2CH_2O\}_{g1}H$--;

Col. 7, line 39 change: "$M^{n+},:Al^{111}$" to read

--$M^{n+}:Al^{111}$--;

Col. 11, line 35 change: "$(zH_2))$" to read

--$(zH_2O))$--;

Col. 11, line 49: change "$R_1-O-C_mH_{2m-1}X-O]_gR_2$" to read

--$R_1-O\{C_mH_{2m-1}X-O\}_gR_2$--

UNITED STATES PATENT AND TRADEMARK OFFICE
CERTIFICATE OF CORRECTION

PATENT NO. : 5,098,686

DATED : March 24, 1992

INVENTOR(S) : Delprato et al.

It is certified that error appears in the above-identified patent and that said Letters Patent is hereby corrected as shown below:

Col. 16, line 41: change "$Ha_2O$" to read --$Na_2O$--;

Col. 18, line 53: change "$19N^+$" to read --$19Na^+$--;

Col. 25, line 3: change ">Si$<R_R^R$" to read -->Si$<_R^R$ --;

Col. 25, lines 13-15: change "$R_1\text{-}O\text{-}C_mH_{2m-1}X\text{-}O)_g R_2$" to read --$R_1\text{-}O\text{+}C_mH_{2m-1}X\text{-}O\text{)}_g R_2$--;

Col. 25, line 24: change "$HO\text{-}CH_2CH_2C\text{-}$" to read --$HO\text{+}CH_2CH_2C\text{-}$--;

Col. 25, line 26: change "$CH_3O\text{-}CH_2CH_2O)_{g1}H$" to read --$CH_3O\text{+}CH_2CH_2O\text{)}_{g1}H$--;

Col. 25, line 27: change "$OH\text{--}CH_2CH_2CH_2O)_{g1}H$" to read --$OH\text{+}CH_2CH_2CH_2O\text{)}_{g1}H$--;

Col. 26, line 60: change "$R_1\text{-}O\text{-}C_mH_{2m-1}X\text{-}O]_g R_2$" -- to read --$R_1\text{-}O\text{+}C_mH_{2m-1}X\ O\text{)}_g R_2$--;

Col. 27, line 7: change ">Si$<R_R^R$" to read -->Si$<_R^R$ --

UNITED STATES PATENT AND TRADEMARK OFFICE
CERTIFICATE OF CORRECTION

PATENT NO. : 5,098,686
DATED : March 24, 1992
INVENTOR(S) : Delprato et al.

It is certified that error appears in the above-identified patent and that said Letters Patent is hereby corrected as shown below:

Col. 27, line 19: change "$HO-CH_2CH_2\ O)_{g1}H$" to read $$--HO(CH_2CH_2O)_{g1}H--;$$

Col. 27, line 20: change "$CH_3-O-CH_2CH_2O)_{g1}H$" to read $$--CH_3-O-(CH_2CH_2O)_{g1}H--;$$

Col. 27, line 21: "$HO-CH_2CH_2CH_2O)_{g1}H$" to read $$--HO-(CH_2CH_2CH_2O)_{g1}H--;$$

Col. 27, line 62: change "$M1^{qt}$" to read $--M_1^{qt}--;$

Col. 27, line 68: change "$M1^{qt}$" to read $--M_1^{qt}--;$

Col. 28, line 39: change "$M1^{qt}$" to read $--M_1^{qt}--;$

Col. 29, line 14: change "$u\ M_1^{q+}$" to read $--u\ M_1^{qt}--;$

Col. 29, line 58: change "$u\ M_1^{q+}$" to read $--u\ M_1^{qt}--;$

Col. 30, line 36: change "$Si{<}R^R$" to read $--{>}Si{<}_R^R--;$

Col. 30, line 47: change "$R_1-O-C_mH_{2m-1}X-O)_gR_2$" to read $$--R_1-O-(C_mH_{2m-1}X\ O)_gR_2--;$$

Page 3 of 4

UNITED STATES PATENT AND TRADEMARK OFFICE
CERTIFICATE OF CORRECTION

PATENT NO. : 5,098,686
DATED : March 24, 1992
INVENTOR(S) : Delprato et al.

It is certified that error appears in the above-indentified patent and that said Letters Patent is hereby corrected as shown below:

Col. 31, line 4:  change "macropolyrings" to --macrorings--

Signed and Sealed this

Twenty-sixth Day of October, 1993

Attest:

BRUCE LEHMAN

*Attesting Officer*     *Commissioner of Patents and Trademarks*